United States Patent [19]
Tobin et al.

[11] 3,880,636
[45] Apr. 29, 1975

[54] SHAPING GLASS SHEETS TO COMPLEX BENDS
[75] Inventors: Melvin W. Tobin, New Kensington; Thomas J. Reese, Sarver, both of Pa.
[73] Assignee: PPG Industries, Inc., Pittsburgh, Pa.
[22] Filed: Nov. 27, 1973
[21] Appl. No.: 419,468

[52] U.S. Cl. .................. 65/107; 65/287; 65/DIG. 4
[51] Int. Cl............................................ C03b 23/02
[58] Field of Search ........ 65/DIG. 4, 107, 286, 287, 65/289, 290, 291

[56] References Cited
UNITED STATES PATENTS
| 3,387,962 | 6/1968 | Whitmire | 65/107 X |
| 3,762,903 | 10/1973 | Hamilton | 65/107 |
| 3,762,904 | 10/1973 | Hamilton et al. | 65/107 |

FOREIGN PATENTS OR APPLICATIONS
| 331,784 | 3/1955 | Switzerland | 65/DIG. .004 |

Primary Examiner—Arthur D. Kellogg
Attorney, Agent, or Firm—Edward I. Mates; Thomas F. Shanahan

[57] ABSTRACT

Bending one or more glass sheets to a complicated shape having an axis of bending extending across the sheet from one edge thereof to the opposite edge with one portion of said sheets gently bent and another portion appearing creased about said axis of bending, using a combination of general overall heating with additional localized heating in said axis of bending. When a pair of glass sheets is bent simultaneously according to the present invention, they conform in shape sufficiently to one another so that they can be separated after they are shaped, then reassembled with a layer of plastic interlayer material therebetween and laminated.

8 Claims, 7 Drawing Figures

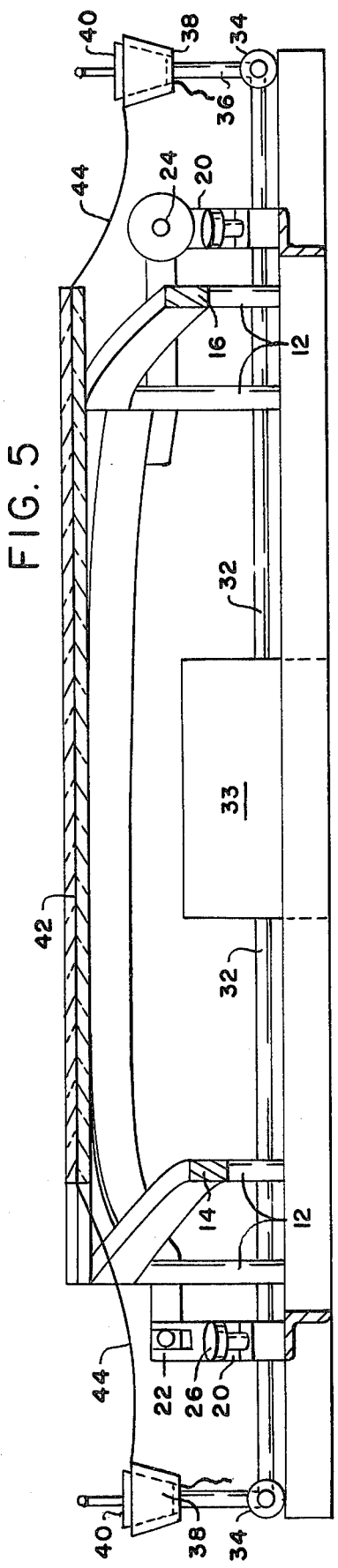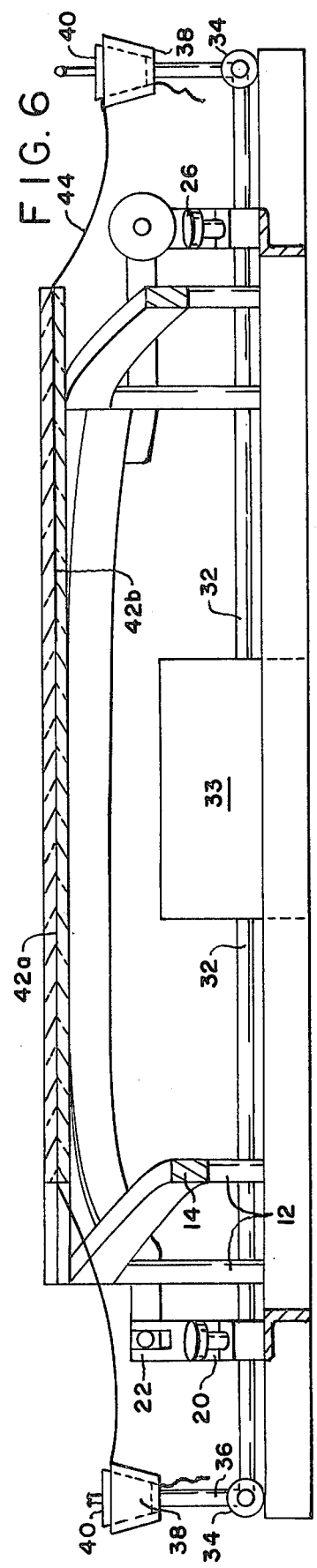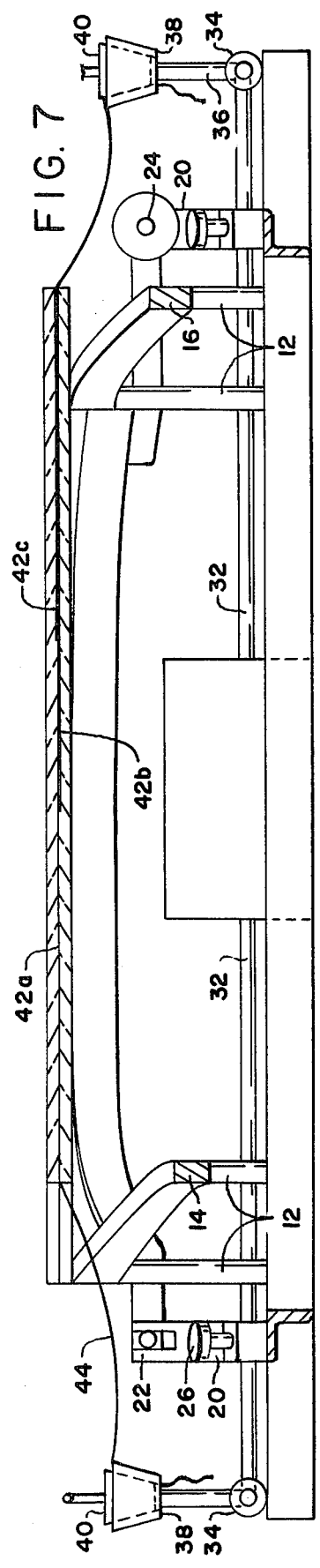

SHAPING GLASS SHEETS TO COMPLEX BENDS

BACKGROUND OF THE INVENTION

This invention relates to fabricating shaped windows, preferably of the type suitable for use as automobile windows. The present invention can be specifically utilized in connection with making laminated windshields or monolithic backlights in which the installed windshield or backlight has a bent portion extending transversely of an elongated window from a creased appearance at one longitudinal side edge thereof to a relatively gently bent portion at its other longitudinal side edge. The V-shaped window may be symmetrical about its transverse axis defining its bent portion of non-uniform radius of curvature or the glass sheet may be bent to complicated shapes in which one or more axes of non-uniform bending extend from one side edge to the other side edge of the sheet that is or are offset with respect to the longitudinal center of the shaped sheet. In addition, the present invention is also suitable for use in fabricating rear-quarter windows for station wagons having a main portion extending forward of the vehicle from a bent corner and a rear portion extending along the rear of the vehicle from said bent corner where the severity of bending along said corner is not uniform.

In addition to automotive glass, the present invention is also suitable for use in fabricating glass shapes having sharply bent portions that gradually reduce in severity of bend from edge to edge of the axis of bending.

Various techniques have been developed to produce a windshield having a sharply bent region. Various patents such as U.S. Pat. Nos. 2,111,392 to Henry J. Galey; 2,176,999 to Robert A. Miller; 2,215,228 to James G. Oliver; and 3,248,195 to James S. Golightly and Harold E. McKelvey suggest various methods and apparatus employing electrical heaters for imparting a relatively sharp bend to a glass sheet. Furthermore, U.S. Pat. No. 2,871,623 to Herman R. Marini and U.S. Pat. No. 3,260,584 to Alfred E. Badger suggest using a heat absorbing material which reradiates heat into a portion to be relatively sharply bent compared to other portions. The heat absorbing material is removed after the glass is shaped. Furthermore, it is also well known to bond electroconductive material onto a surface of a glass sheet in the form of an electrical resistance heating circuit. U.S. Pat. Nos. 2,557,983 to Cyril S. Linder; 2,569,773 to Leighton E. Orr; 2,648,752 to Arnold E. Saunders; 2,648,754 to William O. Lytle; 2,710,900 to Cyril S. Linder; 2,877,329 to Romey A. Gaiser; 2,993,815 to A. W. Treptow; 3,287,684 to Albert Armbruster; 3,302,002 to Robert A. Warren; 3,467,818 to John D. Ballentine; and 3,484,583 and 3,484,584 to Hugh E. Shaw provide examples of electroconductive heating circuits bonded to a surface of a ceramic or glass sheet. In addition, U.S. Pat. No. 3,762,903 to Harold E. Hamilton, U.S. patent applications Ser. No. 239,031 of Robert A. Jansson and Dean L. Thomas, Ser. No. 239,032 of Robert A. Jansson and Thomas J. Reese and Ser. No. 239,033 of Thomas J. Reese and Harry Koontz, all filed Mar. 29, 1972, use electroconductive elements of electrical heating circuits to heat glass sheets against which they are formed or in contact sufficiently to shape the glass along a sharp line of bending extending entirely across the width of the sheets.

It has even been suggested in the prior art to groove the glass in the region of sharp bending. U.S. Pat. Nos. 3,241,936 and 3,281,227 to Herbert A. Leflet, Jr. depict this technique. U.S. Pat. No. 3,762,904 to Harold E. Hamilton, Robert P. Bamford and Paul P. Pastorek forms an electrically conductive path on a sheet to heat the latter in the vicinity of a groove to produce a sharp bend. Such grooving weakens the glass.

Sharp localized bending has also been accomplished by bonding a heat reflecting coating on a portion of a surface opposite the surface facing a heat source. British Pat. No. 942,132 to George Hubble describes such a method.

A method of localized heating using an electroconductive element bonded to a portion of a glass sheet surface is found in Canadian Pat. No. 867,466 to Friedrich Jochim et al.

Heating circuits used in the past to bend glass sheets sharply have been interconnected between bus bars disposed along the opposite edges of the glass sheet. In the past, the heating circuit elements extended across the entire width of the glass sheet to be shaped to insure that the sharp bend extends completely across the windshield.

To the best of our knowledge, no one has successfully shaped a glass sheet to a shape that changes from a V-shaped crease along one side edge thereof to a gentle shape along the opposite side edge thereof. Such a shape is of interest to automobile stylists who would like to blend the shape of an automobile windshield or backlight into the shape of the body of the automobile in which it is installed to blend from a roof to a hood or trunk line where one is creased and the other is relatively smooth.

SUMMARY OF THE INVENTION

The present invention provides a method of bending one or more glass sheets simultaneously to a complex shape including a sharply creased portion at one edge of each sheet and a gently bent portion at the opposite edge along an axis of non-uniform bending using a combination of overall heating of the glass sheet with a novel manner of applying additional heating to the non-uniformly bent portion.

According to the present invention, the complex shape is accomplished while supporting the glass on an outline mold by applying an electric voltage to an electroconductive heating element contacting a surface of the sheet along an axis of bending and the heating element so placed has a relatively high resistance per unit length in the vicinity of the region to be bent sharply and a relatively low resistance per unit length in the vicinity of the region to be bent to a relatively shallow curvature. The voltage is applied after the glass sheet has been heated to at least its strain point. The voltage imparts a greater degree of heat into the glass region adjacent the portion of the heating element having a relatively high resistance and a lesser degree of heat into the glass region adjacent the portion of the heating element having a relatively low resistance. Thus, a sharp line of bending is imparted to a portion of the width while another portion of the width is not so sharply bent along an extension of the line. Timely discontinuance of the application of the voltage enables the opposite side edges to retain different degrees of bending simultaneously, whereas further application of the voltage may cause the uncreased portion to develop an extension of the crease.

The outline mold that supports the glass sheet or sheets during the novel bending method has a pair of shaping rails disposed on opposite sides of the axis of non-uniform bending. One of said shaping rails has an upper shaping surface that includes a sharply bent portion while the other of said shaping rails has an upper shaping surface that is gently bent. The outline mold may be sectionalized and the end sections pivoted between an open position to receive a flat glass sheet for bending and counterweighted to pivot into a closed position when the glass is softened sufficiently to conform to the outline surface of the mold.

The resulting laminated window produced after bending glass sheets in pairs comprises two glass sheets conforming in shape and outline to one another with a layer of flexible plastic resin such as a polyvinyl acetal resin or a polyurethane resin adhering the glass sheets to one another in aligned relationship. It is preferred to use an electroconductive heating strip that is applied between the glass sheets during the bending of the pair to be laminated.

While the laminated window described herein may be a modified V-shaped windshield having a sharp crease extending only partly across the width of the glass sheet to form two main portions symmetrically arranged with the respect to said modified V-shaped axis, the present invention is also adapted for any configuration of glass that incorporates a non-uniform line of bending extending across a glass sheet from a creased edge portion to a gently bent edge portion in offset relation to the center of the sheet.

The details of the present invention will be understood better in the light of a description of illustrative preferred embodiments and variations thereof that follow. In the drawings that form part of the description, like reference numbers refer to like structural elements.

BRIEF DESCRIPTION OF THE DRAWINGS

FIGS. 5, 6 and 7 are cross-sectional views showing the arrangements of different embodiments of electroconductive material arranged relative to a pair of glass sheets to be bent while supported on an outline mold.

DESCRIPTION OF THE PREFERRED EMBODIMENTS

Figure 1:
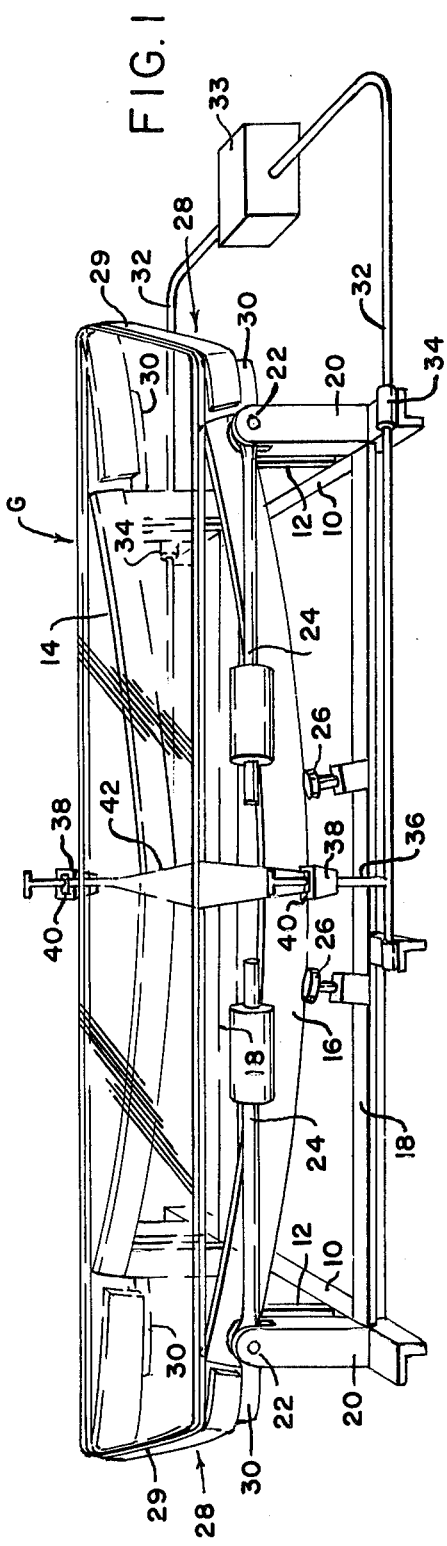
FIG. 1 is a front view of an outline, sectionalized glass sheet bending mold with a pair of glass sheets to be bent to the shape of a complicated windshield mounted on the mold preparatory to bending, showing how a ribbon of electroconductive material of non-uniform conductivity is arranged relative to the glass sheets to be bent to provide additional localized heating while shaping a pair of glass sheet along a line of non-uniform bending, according to one embodiment of the present invention.

The drawings show how different arrangements of electroconductive material are used in a typical embodiment of apparatus for simultaneously bending a pair of glass sheets to form a pair of shaped glass sheets to be laminated to produce a laminated automobile windshield. The mold upon which the glass sheets are shaped comprises a pair of cross bars 10. Each of the cross bars 10 supports a number of vertical posts 12. Some of the vertical posts 12 along one side of the mold support the ends of a shaping rail 14 having an upper edge glass receiving surface of V-shaped configuration while other vertical posts 12 along the other side of the mold support a shaping rail 16 whose upper edge forms a surface of gently shaped configuration. These are the shapes desired along the longitudinal edges of the glass sheet G supported for bending on the mold. A number of longitudinal members 18 interconnect the cross bars 10 to form a frame like structure adapted to be supported on a mold carriage (not shown) for movement in a direction transverse to the length of the glass sheet supported on the mold for movement through a conventional glass bending lehr. Beyond the vertical posts 12 that support the shaping rails 16 and 14 there are provided four hinge support posts 20 each of which supports a hinge 22. One of the elements of each of the hinges 22 comprises a lever arm 24 adaptable for pivoting in a substantially vertical plane about an axis defined by the associated hinge 22. A stop member 26 is provided for engagement by the inner end of the each lever arm 24.

In addition to the shaping rails 14 and 16 that extend longitudinally of the mold, there are also provided two end molding sections 28. Each of the end mold sections comprises an end mold section rail 29 whose upper edge forms a surface conforming in elevation and outline to the shape desired for one or the other longitudinal end portions of the glass sheets to be shaped on said mold. Each end mold section 28 also comprises an outrigger 30 rigidly attached to the under surface of the end mold section rail 29 and extending outside the mold toward one of the hinges 22 to which it is pivotally attached in rigid relationship to the weighted arm 24 also associated with the respective hinge 22.

The mold as described thus far comprises a typical sectionalized bending mold of the outline type in which center section shaping rails 14 and 16 provide intermediate support for one or more flat glass sheets supported thereon for bending in cooperation with the outer ends of the end mold section rails 29. The lever arms 24 cause the end mold sections 28 to pivot from their spread position in which they support the flat glass sheet into a closed position where their upper edges form continuations of the shaping surfaces provided along the upper edges of the shaping rails 14 and 16 so that the shaping rails form an outline shaping surface to which the glass sheet conforms when shaped.

The present apparatus also includes means to provide electrical energy to a narrow elongated portion of a glass sheet supported on the mold for bending. The present apparatus provides a pair of electrical leads 32, one end of which extends longitudinally of the mold along a line outwardly and slightly below shaping rail 14 and the other end of which extends along a parallel line outwardly and slightly below shaping rail 16. The leads extend from a junction box 33 suitably supported on the mold support frame in position to be accessible to electrodes from a potential source (not shown). Lead support means 34 are provided and carried by the frame structure formed by the cross bars 10 and longitudinal members 18 to support the leads 32. The electrical leads are low resistance elements, such as stainless steel rods suitably mounted in ceramic insulation where needed to avoid shorting with the mold structure. Each electrical lead is connected near one end remote from the junction box 33 to an upwardly directed electrical connector 36 which leads into a box-type electrode 38.

Figure 3:
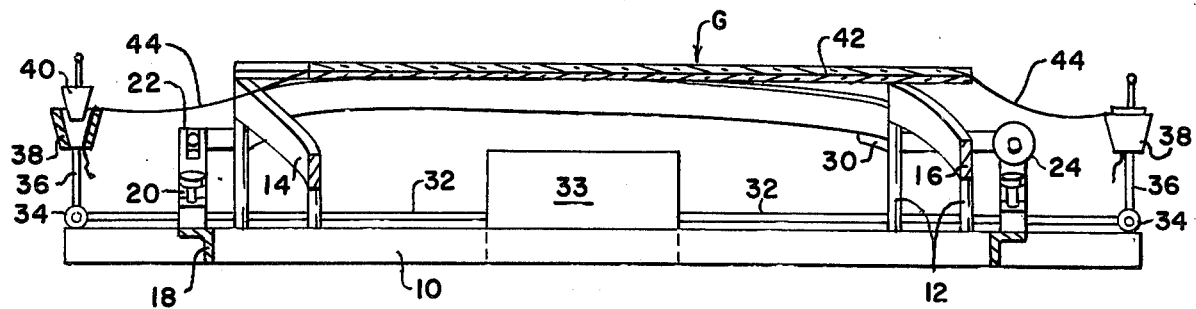
FIGS. 3 and 4 are cross-sectional views of a mold loaded with a pair of glass sheets before and after shaping, respectively, showing how a strip of electroconductive material is arranged between the pair of glass sheets to be bent in unison before and after the shaping cycle.
Figure 4:
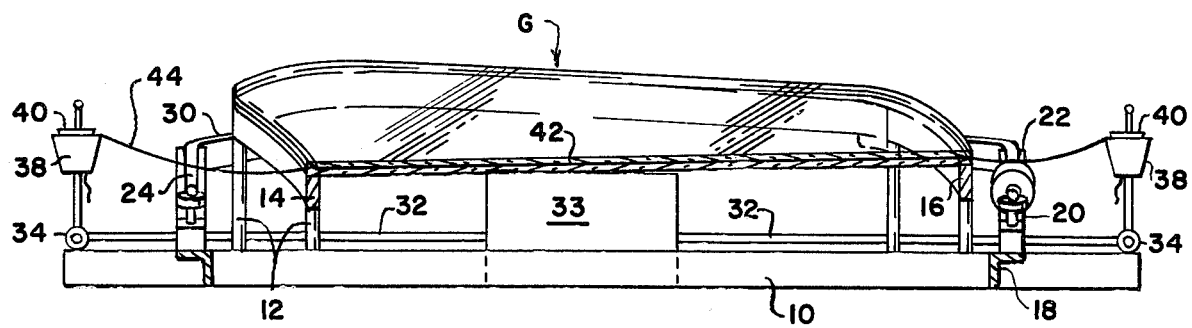

A wedged shaped weighted electrode clamping element 40 is adapted to be received into the box-like electrode 38 to clamp an end portion of a conductive ribbon 42. The latter extends across the mold with its other end portion similarly engaged between a wedged shaped weighted electrode element 40 and a box-type electrode 38 adjacent the opposite longitudinal side edge of the mold as depicted in the drawings. The left side of FIG. 3 shows how one end portion of a ribbon 42 is threaded through te electrode 38 with the clamping element removed, while FIG. 4 shows electrodes 38 with the clamping elements 40 in ribbon clamping position.

When a pair of glass sheets is to be bent simultaneously for subsequent lamination, the ribbon 42 is usually mounted across the upper surface of the lower glass sheet and the upper glass sheet is superimposed over the lower glass sheet to sandwich the main portion of the ribbon 42 therebetween along the line desired for sharp bending. One or both end portions 44 of the ribbon 42 is made loose between the places where the ribbon extends from each side of the glass sheet pair and the places where the elctrode element 40 clamps the ribbon 42 to each electrode 38. When the pair of glass sheets sags to conform to the outline shaping surface of the mold, the loose portion 44 becomes less relaxed, but still remains sufficiently long to avoid breakage and to provide an electrical connection between electrodes 38. The weight of the upper glass sheet keeps the ribbon straight along the line of sharp bending when the ribbon is applied between the two sheets. The only change in ribbon configuration takes place in the portions 44 during the shaping operation. A comparison of FIGS. 3 and 4 shows how the loose end portions 44 follow the sagging of the glass sheets during bending. When voltage is applied, the ribbon is a heating element.

Figure 2:
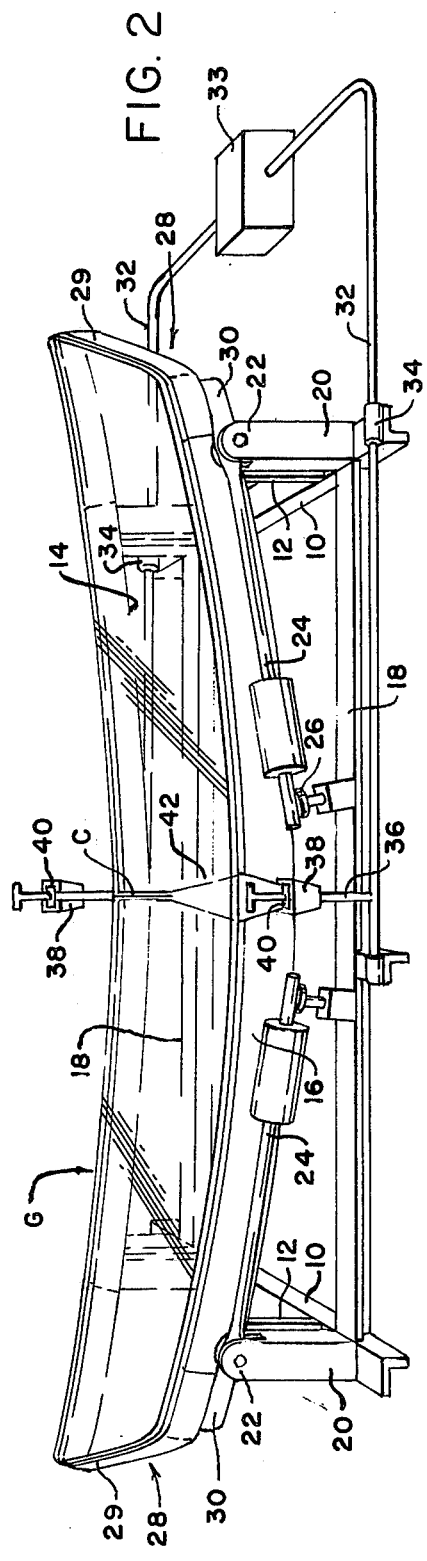
FIG. 2 is a view similar to that of FIG. 1, showing the relation of the sheets to the glass shaping mold and, particularly, the relation of the creased portion to the electroconductive ribbon, after bending.

In order to provide a so-called partial V-bend that graduates from a crease C (see FIG. 2) adjacent the V-shaped shaping rail 14 to a more gentle shape for the glass sheet edge in the vicinity of the gently shaped shaping rail 16, an electroconductive ribbon 42 is used that has a relatively high resistance per unit length in the vicinity of the V-shaped rail 14 and a lower resistance per unit length in the vicinity of the gently shaped shaping rail 16. One technique employed to provide such an electro-conductive element is to use electrical resistance tape of graphite having a narrow width (about 4 to 6 mm) extending from the edge that sags onto the sharply bent shaping rail 14 for approximately the distance desired for the crease (such as approximately 12 inches or 300 mm) and than having the remainder of the tape approximately 1 inch (25.4 mm) or 2 inches (50.8 mm) at the portion that contacts the portion of the glass sheet along the line of nonuniform bending that is to be less sharply bent. Another technique is to use a metallic ribbon that is completely exposed along one portion of its length to be creased and aligned with carbon tape or other electroconductive material along the other portion where a more gradual bend is desired.

Each of the embodiments described has an advantage and a disadvantage. Graphite tape may be used without a parting material between the two glass sheets to be shaped simultaneously. However, graphite can only be used for one bend and must be replaced with another ribbon of graphite tape for each bending cycle. Metallic ribbon may be reused. However, it is necessary to apply parting material such as finely divided talc to each glass-ribbon interface before the respective interface is covered to insure that the metallic ribbon does not fuse into the heat softened glass sheet during shaping. Nickel-chromium alloys are preferred metals.

In preparing a pair of glass sheets for simultaneous bending, first a pair of glass sheets is assembled with a ribbon 42 of electroconductive material extending across and between the glass sheets with loose portions 44 beyond each side. The assembly is mounted on the bending mold with its edge to be bent to relatively shallow curvature superimposed over shaping rail 16 and its edge to be creased superimposed over shaping rail 14. The ribbon is clamped at one loose portion 44 in one of the box type electrodes 38 with a wedged shaped weighted electrode clamping element 40 superimposed over one end of the conductive ribbon 42 to insure a good electrical contact between the electrode 38 and the ribbon 42. The opposite end of the ribbon 42 is inserted into the other box type electrode 38 along the opposite side edge of the mold with sufficient looseness to allow the end portions 44 to be relaxed. A wedge shaped weight electrode clamping element 40 is inserted into the other box-type electrode to provide good electrical connection to the opposite electrode 38. The ribbon extends straight across the sheet along the line of non-uniform bending with the less conductive portion of the ribbon facing the portion of the line of bending in the glass that is to be creased. The flat glass sheets, precut to the outline desired for the laminated windshield, are supported on the ends of the shaping rails 16 and 14 as well as along the outer ends of the outwardly pivoted end mold sections 28. The mold laden with a pair of glass sheets is placed in a bending lehr of tunnel type configuration and the glass laden mold is gradually heated to a temperature sufficient to avoid thermal breakage when the glass is heated more intensely in line with the ribbon.

The electroconductive heating element 42 is preferably either a thin, flexible metal strip or graphite tape having an electrical resistance per unit length of between 0.01 and 0.25 ohms per inch facing the region of sharp bending and a less resistance per unit length elsewhere. Particularly good results are obtained with a nichrome ribbon 3/16 inch wide, 0.005 inch thick and having a resistance per unit length of 0.58 ohms per foot (or approximately 0.05 ohms per inch), although any conductive metal in strip form that does not tarnish readily and that does not become bonded to the glass or react chemically with the glass at the elevated temperature needed for bending is acceptable. Metal strips of less than ⅛ inch (3mm) width distort the glass and tend to fuse the glass portion being bent sharply when sufficient electrical energy is supplied to induce the sharp bending required locally. On the other hand, metal strips wider than ¼ inch are not suitable for producing the very sharp bends presently required.

Different glass sheet dimensions require different optimum crosssectional areas for the heating ribbon to provide sufficient localized resistance heating and to provide a differential of heating from the portion to be creased to the portion to remain gently bent. The ribbon must be sufficiently thin to avoid any optical distortion caused by the heating ribbon penetrating into the heat softened portion of the glass undergoing sharpest bending so that it flexes as the glass forms a V. In addition, the flexible metal ribbon must be sufficiently narrow so that the line of sharp bending is as narrow as possible so that it does not become necessary to cover the creased portion with an opaque coating to hide an area of optical distortion. When carbon tape is used as the electroconductive ribbon to provide the localized heat, it is less likely to penetrate into or otherwise mark the glass sheet on which it is applied. Carbon or graphite tape is more flexible and has less density than a flexible metal ribbon. However, a carbon or graphite tape of a given cross-section is usually less conductive than a flexible metal ribbon. Hence, higher voltages and/or greater thicknesses may be needed for graphite than for metal ribbons.

The two glass sheets with the thin electroconductive ribbon disposed therebetween aligned with the line of said crease and an extension of the crease to be gently bent with parting material disposed between their adjacent surfaces, are supported in superimposed aligned relationship as an assembly on the outline bending mold of the gravity sag type described previously. The parting material is preferably of a type that need not be removed from between the bent sheets, such as a diatomaceous earth disclosed and claimed in U.S. Pat. No. 2,725,320 to Florin V. Atkeson and James S. Golightly.

The mold is heated in the preheat section of a tunnel-type bending lehr at such a rate that it reaches a temperature between the strain point and the softening point at a time when the line to be bent locally is ready for additional heating. Thus, the electrical leads 32 are brought into electrical coupling with a source of electrical power (not shown) by engaging power leads with the junction box 33 to provide a voltage difference between the electrodes 38 to heat the ribbon 42.

The overall heating within the lehr continues at a rate insufficient to cause the remainder of the sheet to sag while the electrically heated ribbon transfers heat into the line of bending and the glass sags by gravity with one side conforming to the shaping rail 14 and the other side conforming to the shaping rail 16. Due to the fact that there is greater heat applied along the conductive ribbon into the adjacent portion of the glass sheet adjacent shaping rail 14 than adjacent shaping rail 16, the glass is bent sharply and develops a crease near rail 14. Care must be taken to discontinue the non-uniform localized heating along the line of non-uniform bending before the crease extends into the portion desired to be less sharply bent. At the proper time, the power leads are disconnected from the junction box 33. If needed, the lehr heating continues to complete sag bending the glass in other local regions. Then, the annealing cycle starts.

FIGS. 5, 6 and 7 show how various embodiments of electroconductive ribbons of non-uniform conductivity per unit length are arranged to provide a partial V-bend across the width of glass sheets.

In FIG. 5, the ribbon is a graphite ribbon 10 mils thick having a ¼ inch wide portion extending along the first 12 inches of the width of the glass and gradually increasing to 1 inch width over the remainder of the width. The end portions 44 of the ribbon extending to clamped attachments to electrodes 38 are made of greater width than the narrow portion or may have metal laminated thereto to reduce the resistivity per unit length of the portions not aligned with the portion of the axis of bending across the glass that includes a creased portion.

In FIG. 6, the ribbon is composed of two layers, with a layer 42a of a nichrome ribbon 3 mils thick and ¼ inch wide extending completely across the ribbon and continuing with end portions 44 suitably clamped to electrodes 38 and a short layer 42b of graphite ribbon about 5 mils thick and ¼ inch wide aligned below the portion of the nichrome aligned with the portion of the line to be bent more gently.

FIG. 7 shows still another embodiment utilizing the combination of a nichrome ribbon 42a extending completely across the glass sheet along the line of non-uniform bending and having its end portions 44 clamped to electrodes 38 as in the previous embodiments. In this embodiment, the nichrome ribbon 42a is 3 mils thick and ¼ inch wide and is aligned with a graphite ribbon 42b approximately 5 mils thick and ¼ inch wide extending inward approximately 18 inches from the edge to be less sharply bent and is disposed below the nichrome ribbon 42a, and superimposed above the first ribbon 42a for a distance of approximately 12 inches inward from said edge is another graphite ribbon 42c approximately the same width and thickness as graphite ribbon 42b.

In order to produce the sharp bend of non-uniform severity, two flat sheets of commercial float glass, each having a thickness of about 0.100 inch, about 31 inches wide at the center line and about 60 inches long and conforming in outline to the outline desired, are mounted on an outline mold with the end sections pivoted outward to support the glass sheets. The conductive ribbon or ribbons is or are applied in such a manner that the narrow portion of the graphite ribbon 42 of the FIG. 5 embodiment or the uncovered portion of the nichrome ribbon 42 of the embodiments of FIGS. 6 and 7 is aligned with the portion to be creased and the wider portion of the graphite ribbon or the portion or portions of the nichrome ribbon faced with graphite aligned with the rest of the width of the glass sheet to be bent less sharply than the portion to be creased.

In case a single glass sheet is loaded for bending, only one of the ends of the ribbon need be clamped initially because the ribbon remains clamped at its other end from a previous bending operation. Nichrome ribbons are suitable for reuse, so may be unclamped at one end only after a bending cycle is completed and reused after its unclamped end is reclamped. The graphite ribbons used in conjunction with the nichrome ribbon may be applied directly to the surface of the glass sheets facing the uncreased portion of the line of non-uniform bending before the glass sheet is mounted on the mold for bending.

The loading mold is then introduced into a bending lehr where the glass is subjected to a preheat lehr section maintained at a temperature above the strain point and below the softening point of the glass (preferably between about 1000°F. and 1100°F.) for sufficient time to heat the glass to about 980°F. to 1050°F. Then voltage is applied across the line to be bent to a nonuniform severity until the portion aligned with the electroconductive ribbon sags in its portion to be creased to contact the severely bent shaping rail at one side and the center of the other side of of the glass conforms to the gently shaped rail. Voltage is discontinued before the crease extends beyond where it is desired. The glass sheet so shaped is then retained on the mold and subjected to whatever additional temperature cycle is needed to complete the bend in other regions using only lehr heat. The completely bent glass is then cooled in a staged cooling environment of approximately 1100°F. to 800°F. to control the anneal that develops in the bent glass, using techniques well known in the glass annealing art.

A few experiments were needed to determine the optimum time for starting and stopping the voltage application after the glass was introduced into a lehr and the voltages and currents needed for the localized bend. In these experiments, the nichrome ribbons used were of nichrome V, an alloy of 80% nickel and 20% chromium, while the graphite tapes used were cut from 6 inch wide rolls of non-adhesive graphite tape sold as Grafoil tape Grade GTA Stock No. 03540 by Union Carbide.

In all the experiments reported below, the lehr roof was set for a preheat zone temperature of 1035°F. and the current and voltage applied across a ribbon extending across glass sheets 31 ½ inches wide according to different programs tried. After electric power was removed, the bent glass was then conveyed through a final bending zone and an annealing zone of the bending lehr. The final bending zone was set for a roof temperature of 1180°F. and the annealing zone set for roof temperatures of 1100°F. to 800°F. The bending cycle was 45 seconds, and the annealing cycle, which followed the final bending cycle immediately, did not affect the shape of the glass, only the stress pattern, and lasted as long as desired.

EXAMPLES

The final bending did not affect the non-uniform shape imparted to the center line by electrical heat, but was used to shape the end sections of the glass sheets relative to the center portion. In all of the following examples, the center portions of the glass sheets were sharply bent to form a crease that extending across a portion only of the width, with the rest of the width bent gently without a crease.

1. A pair of glass sheets were mounted on a mold of the type depicted in FIG. 1 with a nichrome ribbon 3 mils thick ¼ inch wide and having a resistance of 0.034 ohms per inch of length extending across the entire width of the glass and a 5 mil thick graphite ribbon placed under 12 inches at one side of the nichrome ribbon between the two glass sheets. A successful bending program for this configuration was:
   390 seconds preheat at 1035°F. roof temperature with no power through ribbon
   45 seconds of added heat at 1035°F. roof temperature with 32 volts and 10 amperes through ribbon
   30 seconds of added heat at 1035°F. roof temperature with 43 volts and 14 amperes through ribbon
   Power to ribbon discontinued and final bending begun.

2. A successful bending program for partial V-bend of the same pattern using an 18 inch length of said graphite ribbon below and a 12 inch length of said graphite ribbon above the 3 mil thick ¼ inch wide nichrome ribbon was:
   420 seconds of preheat at 1035°F. roof temperature with no power through ribbon
   40 seconds of added heat at 1035°F. roof temperature with 40 volts and 14 amperes through ribbon
   Power to ribbon discontinued and final bending begun.

3. Another successful bending program using the same arrangement of nichrome and graphite ribbon as in Example 2 was:
   390 seconds of preheat at 1035°F. roof temperature with no power through ribbon
   55 seconds of added heat at 1035°F. roof temperature with 50 volts and 8 amperes through ribbon
   Power to ribbon discontinued and final bending begun.

4. A still further successful partial V-bend was made using a composite of nichrome ribbon 3 mils thick, ¼ inch wide (0.034 ohms per inch) with a 24 inch length of said graphite ribbon aligned below said nichrome ribbon from one side and an 18 inch length of said graphite ribbon aligned above said nichrome ribbon from said same side. The program for this bend was:
   390 seconds of preheat at 1035°F. roof temperature with no power through ribbon
   55 seconds of additional heat at 1035°F. roof temperature with 45 volts and 8 amperes through ribbon
   Power to ribbon discontinued and final bending begun.

EXAMPLES 5–9

The following experiments were performed using graphite ribbon of non-uniform width. The resistance per unit length of the graphite ribbon was 0.218 ohms per inch for a ¼ inch wide 5 mil thick ribbon and 0.162 ohms per inch for a 10 mil thick ribbon of said width. The resistance per unit length lessened as the width increased. In all these cases where graphite ribbon was used as the resistance heating element, the thinner portion of the ribbon was aligned with the portion of the line of bending to be bent to a crease and the wider portion of the ribbon was aligned with the portion of the line of bending to be bent more gently without a crease.

5. A graphite ribbon having a thickness of 10 mils and a length of 12 inches ¼ inch wide disposed between the glass sheets along the line of non-uniform bending extending inward from one side of the sheets and widening in width to 1 inch at the other side of the glass sheet pair was connected between a pair of clamping electrodes to extend across the line of non-uniform bending. The following program was used to produce a partially creased bend successfully:
   390 seconds preheat at 1035°F. roof temperature with no electrical power
   10 seconds of added heat at 1035°F. roof temperature with 20 volts and 6 amperes through ribbon
   10 seconds of added heat at 1035°F. roof temperature with 26 volts and 8 amperes through ribbon
   70 seconds of added heat at 1035°F. roof temperature with 33 volts and 10 amperes through ribbon
   Power to ribbon discontinued and final bending begun.

6. The same arrangement of mold and glass sheets was provided as in Example 5, except the graphite tape widened in width to a 2 inch wide portion beyond 12 inches of length ¼ inch wide in contact with the glass.

A successful bend comprising a partial crease resulted using the following cycle:
- 390 seconds preheat at 1035°F. roof temperature with no power through ribbon
- 83 seconds of added heat at 1035°F. roof temperature with 30 volts and 10 amperes through ribbon
- Power to ribbon discontinued and final bending begun.

7. The same arrangement was used as in Example 6, except that the narrow portion of the ribbon was 3/16 inch wide and 12 inches long. The following cycle produced a successful partially creased bend:
- 390 seconds preheat at 1035°F. roof temperature with no power through ribbon
- 80 seconds of added heat at 1035°F. roof temperature with 30 volts and 8 amperes through ribbon
- Power to ribbon discontinued and final bending begun.

8. The same arrangement was used as in Example 6, except that the ribbon width increased from ¼ inch to 2 inches in 1 inch of length, leaving a 12 inch long ribbon portion ¼ inch wide contacting the portion of the line of bending to be creased and a ribbon portion 2 inches wide and 18 ½ inches long contacting the portion of the line of bending to be bent less sharply. The following cycle produced a successful partial crease:
- 390 seconds preheat at 1035°F. roof temperature with no power through ribbon
- 77 seconds of added heat at 1035°F. roof temperature with 30 volts and 10 amperes through ribbon
- Power to ribbon discontinued and final bending begun.

9. The same arrangement was used as in Example 8, except that the narrow portion of the graphite ribbon was 3/16 inch wide instead of ¼ inch. A successful bend having a partial crease resulted from the following cycle:
- 390 seconds preheat at 1035°F. roof temperature with no power through ribbon
- 45 seconds of added heat at 1035°F. roof temperature with 35 volts and 10 amperes through ribbon
- Power to ribbon discontinued and final bending begun.

After bending, the pairs of glass sheets are removed from the mold, the nichrome tape being released from the clamping electrode at one end and available for reuse, if used. Excessive parting material facing the nichrome that may remain after bending is removed and a sheet of plasticized polyvinyl butyral or polyurethane is assembled between the sheets and the assembly subjected to a prepressing and laminating cycle of the type described in U.S. Pat. No. 2,948,645 to L. A. Keim, the disclosure of the pressing and laminating cycle of said patent being incorporated by reference. The laminated window that results is ready for installation.

While the examples employed nichrome ribbon or graphite tape or combinations thereof for the electroconductive heating element applied to the line of non-uniform bending, it is understood that any well known electroconductive material that is flexible and does not melt throughout the temperature cycle needed to bend glass, that is ductile, that does not react chemically with glass, and which may be removed after the glass is bent, is suitable. Furthermore, if there is no objection to having a pattern of opaque material extending across the sheet, the electroconductive material may be composed of a metal-organic frit that fuses to the glass during the shaping operation. However, a fusible frit is limited to being applied to an outer surface or outer surfaces of an assembly of glass sheets to be bent in unison.

The form of the invention described in this specification represents certain preferred embodiments thereof. It is understood that various changes in materials, dimensions and other parameters, such as applying the line of electroconductive material along an outer surface of a glass sheet, for example, may be made without departing from the gist of the present invention as defined in the claimed subject matter that follows.

We claim:

1. A method of bending a glass sheet along a line of bending that has a creased appearance in one portion of said line and a gently bent uncreased appearance in another portion of said line, comprising applying a line of electroconductive material of non-uniform electroconductivity per unit length along a surface of the glass sheet to be bent in such a manner that a portion of said electroconductive material having a greater resistance per unit length is aligned with the portion of the glass sheet to develop a creased appearance and a portion of said line of electroconductive material having a lesser resistance per unit length is aligned with the portion of the line to be bent to develop an uncreased appearance, supporting the glass sheet with said electroconductive material so arranged in bending relation to a shaping mold, heating the glass sheet with the electroconductive material applied thereto to a temperature between the strain point and the softening point of the glass sheet in an enclosed atmosphere, applying electric power through said line of electroconductive material, causing said heated glass sheet to become heated at a non-uniform rate along said line of bending and bent sharply to form a creased appearance in the region aligned with the portion of electroconductive material having greater resistance per unit length and bent gently to an uncreased appearance in the region of said glass sheet aligned with said portion of electroconductive material having lesser resistance per unit length and discontinuing the application of said electrical power before the gently bent portion develops a crease.

2. The method according to claim 1 wherein said glass sheet is supported over an outline mold of the sag bending type for bending and said portion that develops said creased appearance at one side edge portion of said glass sheet along said line of bending is received on a sharply bent portion of a shaping surface of said mold provided with said sharply bent portion and the opposite side edge portion of the glass sheet that develops an uncreased appearance along said line of bending is received on a shaping rail having a shaping surface that is gently bent.

3. The method according to claim 1, comprising applying said electroconductive material in the form of a ribbon having a non-uniform cross-section, and aligning the portion of said ribbon having less cross-section with the portion of the line of bending where said creased appearance is desired.

4. The method according to claim 1, comprising applying said electroconductive material in the form of a first electroconductive ribbon extending completely across the width of the glass sheet in alignment with said line of bending and applying a second electroconductive ribbon in contact and in alignment with said first electroconductive ribbon along a portion of said line of bending where the glass is to be bent to an uncreased appearance.

5. The method according to claim 2, including further heating the shaped glass sheet in the adsence of electrical power through said line of electroconductive material to sag the remainder fo the outline of said glass sheet to said outline mold.

6. Apparatus for bending a glass sheet along a line of non-uniform bending that has a creased appearance in one portion of said line and an uncreased appearance in another portion of said line comprising an outline mold having a shaping rail extending along one side of said outline mold and having an upper surface provided with a V-shaped configuration with the V aligned with said line of non-uniform bending and a shaping rail extending along the opposite side of said outline mold and having an upper surface of gentle curvature, an electrode located laterally outside each said shaping rail in alignment with said line of non-uniform bending, an electroconductive ribbon connected to said electrodes and extending across said outline mold in alignment with said line and having a greater resistance per unit length along a portion of said ribbon that faces the portion of said line where a creased appearance is desired and a lesser resistance per unit length along a portion of said ribbon that faces the portion of said line where an uncreased appearance is desired, and means adapted to couple said electrodes to an electrical power source.

7. Apparatus as in claim 6, wherein said ribbon has a thinner portion of greater resistance per unit length and a wider portion of less resistance per unit length.

8. Apparatus as in claim 6, wherein said ribbon comprises a first layer of electroconductive material extending from electrode to electrode and at least one additional layer of electroconductive material aligned with said first layer in position to face a portion of said line where an uncreased apppearance is desired.

* * * * *